United States Patent [19]

Katsuyama et al.

[11] Patent Number: 4,723,234
[45] Date of Patent: Feb. 2, 1988

[54] OPTICAL DISC PLAYER

[75] Inventors: Akira Katsuyama, Yokohama; Shuichi Kimura, Shiki, both of Japan

[73] Assignee: Sony Corporation, Tokyo, Japan

[21] Appl. No.: 20,230

[22] Filed: Mar. 2, 1987

Related U.S. Application Data

[63] Continuation of Ser. No. 582,572, Feb. 3, 1984, abandoned.

[30] Foreign Application Priority Data

Jun. 4, 1982 [JP] Japan .................. 57-95753
Jun. 4, 1982 [JP] Japan .................. 57-95754

[51] Int. Cl.$^4$ .............................................. G11B 3/82
[52] U.S. Cl. ........................................ 369/58; 369/54
[58] Field of Search ................................ 369/44–46, 369/54, 106, 50, 58; 360/15; 250/201 DF

[56] References Cited

U.S. PATENT DOCUMENTS

| | | | |
|---|---|---|---|
| 3,051,795 | 8/1962 | Roberts et al. | 369/58 X |
| 3,551,608 | 12/1970 | Balint | 360/15 |
| 4,446,546 | 5/1984 | Miller | 369/45 |
| 4,512,003 | 4/1985 | Kimura et al. | 369/45 |
| 4,544,837 | 10/1985 | Tanaka et al. | 369/45 |

FOREIGN PATENT DOCUMENTS

| | | | |
|---|---|---|---|
| 0064273 | 11/1982 | European Pat. Off. | 369/44 |
| 55-38661 | 3/1980 | Japan | 369/54 |
| 55-38663 | 3/1980 | Japan | 369/54 |
| 57-113436 | 7/1982 | Japan | 369/45 |
| 57-133527 | 8/1982 | Japan | 369/45 |
| 58-100234 | 6/1983 | Japan | 369/45 |

Primary Examiner—Aristotelis M. Psitos
Attorney, Agent, or Firm—Lewis H. Eslinger; Alvin Sinderbrand

[57] ABSTRACT

An optical disc player comprising a preliminary focus control circuit for repeatedly effecting preliminary focus control to bring a focusing control circuit arrangement for a beam of light falling on a disc into a mode of focus control operation, and detecting means for detecting an abnormal operation in the preliminary focus control, wherein an instance in which the disc is improperly loaded with the beam of light falling on a non-information-recorded surface thereof can be detected on the basis of an output signal from the detecting means.

11 Claims, 6 Drawing Figures

OPTICAL DISC PLAYER

This is a continuation of application Ser. No. 06/582,572 filed Feb. 3, 1984 now abandoned.

TECHNICAL FIELD

The present invention relates to an optical disc player for optically reading information recorded on a disc, and more particularly to an optical disc player capable of automatically detecting an instance in which a disc is loaded in place with its information-recorded and non-information-recorded surfaces inverted in error by an operator and of taking a certain corrective action such for example as by unloading the disc or generating a warning sound to let the operator notice the error.

TECHNICAL BACKGROUND

There has been proposed a digital audio disc having recorded thereon audio signals in the form of pulse-coded signals with a series of pits, which will be optically read, for example, to reproduce the recorded audio signals. Unlike conventional phonographic records, most digital audio discs available are "one-sided", having only one information-recorded surface (hereinafter referred to as a "face") with the opposite non-information-recorded surface (hereinafter referred to as a "back") bearing a label which indicates the titles of recorded music pieces and other data. It is therefore possible for an operator to place such a digital audio disc to be played back with the face and back inverted inadvertently into an optical disc player which will reproduce audio signals from the digital audio disc. When the operator commits such an error, the disc player cannot be brought into a playback starting condition, that is, a state of normal preliminary focusing operation unless the operator finds the error in disc loading, although the disc player initiates a preliminary focus control as a usual operation in preparation for playing back the disc. In the event of such an error, therefore, the preliminary focus control is repeated in the disc player through a process which is wasteful and renders the disc player ineffective. Besides, the repeated wasteful process tends to become a source of malfunctions of the disc player.

One proposed way of determining whether the disc is loaded properly or not on the disc player is to employ optical detecting means for discriminating the face from the back of the disc, in addition to an optical pickup means for reading the pits formed on the disc. In such a case, the optical detecting means emits a detecting beam of light to the disc and detects a beam of light reflected from the disc. Since the back of the disc is formed into an unreflecting surface bearing a label or otherwise processed, no or little light is reflected from the back of the disc upon exposure to the detecting light beam and therefore the disc player is arranged, so that a disc placed therein is detected as being improperly loaded in position when no or little light is reflected, and otherwise determined as being properly loaded.

The above discrimination system is disadvantageous in that it is not always able to discriminate accurately the face of a disc from the back thereof as backs of discs of different kinds may have different light reflectivities, respectively.

DISCLOSURE OF THE INVENTION

With the foregoing difficulties in view, it is an object of the present invention to provide an optical disc player capable of reliably detecting an improper loading of a disc by detecting an abnormal preliminary focusing operation.

An optical disc player according to the present invention comprises a preliminary focus control circuit for repeatedly effecting preliminary focus control to bring a focusing control circuit system for a beam of light falling on a disc into a mode of proper focus control operation, and detecting means for detecting abnormal preliminary focusing operation. The detecting means may comprise, for example, means for counting a signal variable in response to starting of the preliminary focus control and issuing an output when the count reaches at least a predetermined number, or means for starting to measure a time interval from an instant at which the first variation in the varying signal occurs and issuing an output when a predetermined time interval has elapsed. An instance in which the disc is loaded with the beam of light falling on a non-information-recorded surface thereof can be detected on the basis of the output from the detecting means.

With the optical disc player thus constructed according to the present invention, any abnormal preliminary focusing operation is detected to produce a detected output and the condition of an improperly loaded disc is determined on the basis of the detected output. Therefore, the ability to determine whether the disc is loaded properly or not is highly effective. The optical disc player of the invention can automatically detect when the disc is loaded with its face and back inverted in error by an operator and a playback operation is initiated, and also can immediately perform a subsequent corrective action such for example as by unloading the disc or issuing a warning to make the operator notice the error. The player is therefore quite convenient in its control. Since no more than a predetermined number of cycles of preliminary focus control are effected, a wasteful repeated operation is prevented to thereby eliminate a source of failures and avoid wasteful energy consumption. Another advantage is that since a preliminary focus control circuit originally provided in the optical disc player is utilized for determining whether the disc is properly loaded or not, the overall configuration thereof is not rendered particulaly complex.

EMBODIMENTS MOST PREFERABLE FOR WORKING OF THE INVENTION

Most preferable embodiments of the present invention will be described with reference to the drawings. Operation related to a preliminary focus control circuit plays an important role in an optical disc player according to the present invention, and therefore the preliminary focus control circuit which can be incorporated in the optical disc player according to the present invention will first be described.

Signals recorded with a series of pits on a disc such as a digital audio can be reproduced by reading the pits with, for example, optically reading means, that is, an optical pickup. In such an arrangement, for example, a laser beam emitted from the optical pickup falls on the pits on the disc and a reflected laser beam which is modulated in intensity by the pits is received by the optical pickup to be converted into electric signals. The optical pickup has a photodetector for detecting focus condition which generates a focus error voltage utilized for effecting focus control to focus the laser beam from the optical pickup correctly on the recorded surface of the disc at all times. More specifically, the focus control is carried out with a focus control circuit arrangement in which a focus drive signal based on the focus error voltage is applied to focus adjusting means which adjusts, for example, the distance of an objective lens of the optical pickup with respect to the recorded surface of the disc. In order to cause the focus control circuit arrangement to perform the focus control in reality, it is necessary that the objective lens be positioned in a certain distance range from the recorded surface of the disc to bring the laser beam into a relatively narrow range of defocused condition extending around a point of precisely focused condition. To meet such a requirement, a preliminary focus control circuit is provided for causing the laser beam to be in such a narrow range of defocused condition as to bring the focus control circuit arrangement into a mode of focus control operation.

Figure 1:
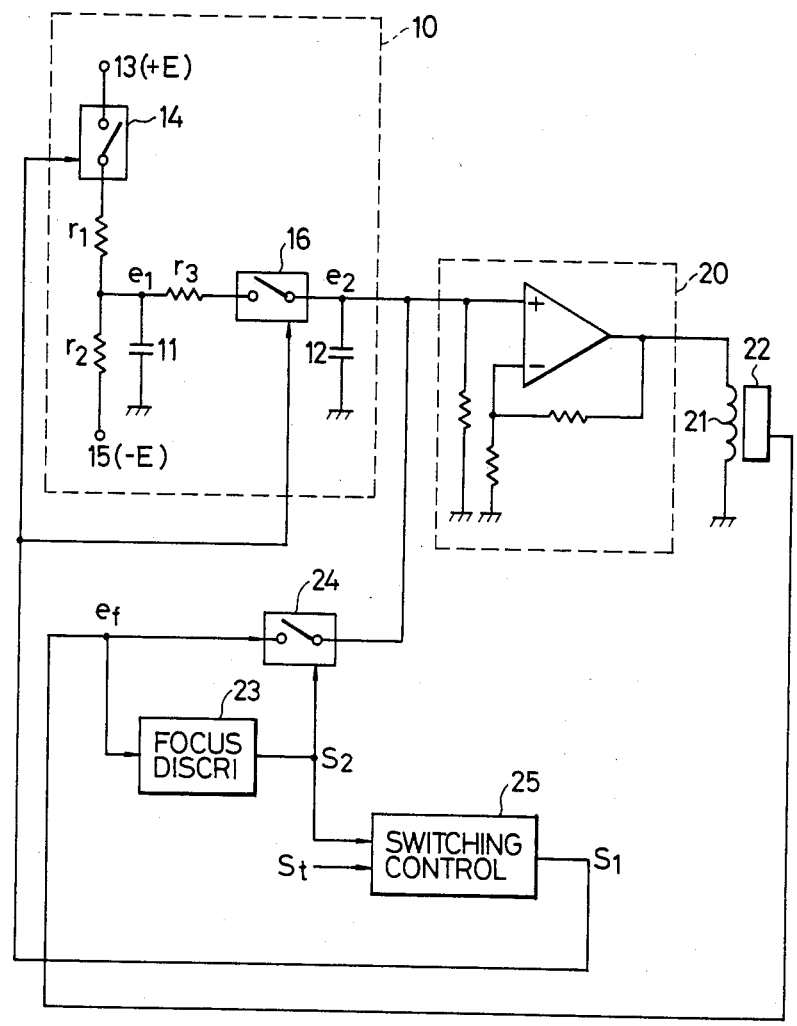
FIG. 1 is a system diagram of a preliminary focus control circuit.

FIG. 1 shows such a preliminary focus control circuit that can be incorporated into an optical disc player according to the present invention. This preliminary focus control circuit will be described with reference to FIGS. 2 and 3. As shown in FIG. 1, a voltage generating circuit 10 generates a preliminary focus control voltage which is variable to change the distance between the objective lens of the optical pickup and the recorded surface of the disc for varying a focusing condition of a light beam. When the objective lens enters a certain distance range so that the focus control circuit arrangement can be brought into the mode of focus control operation, it is preferable that the focusing condition be varied slowly for smoothly switching from the preliminary focussing condition into the focus control condition. To this end, the voltage generating circuit 10 produces as the preliminary focus control voltage a voltage $e_2$ (FIG. 2) which, after a preliminary focusing operation starting time $t_0$, sharply changes to a negative value from a ground potential and then gradually changes through the ground potential up to a positive value.

To produce such a voltage, the voltage generating circuit 10 has two capacitors 11, 12 each having one end grounded, a resistor $r_1$ having resistance value $R_1$ and a switch 14 connected in series between the other end of the capacitor 11 and a terminal 13 capable of supplying a positive voltage $+E$, a resistor $r_2$ having resistance value $R_2$ connected in series between the other end of the capacitor 11 and a terminal 15 capable of supplying a negative voltage $-E$, and a resistor $r_3$ having resistance value $R_3$ and a switch 16 connected in series between the other ends of the capacitors 11, 12. The resistance values $R_1$, $R_2$ have the relationship $R_1 < R_2$. When the switches 14, 16 are turned off, a voltage $e_1$ at the other end of the capacitor 11 is equal to the negative voltage $-E$, while a voltage $e_2$ at the other end of the capacitor 12 is equal to the ground potential. When the switches 14, 16 are turned on at the time $t_0$ shown in FIG. 2, the capacitor 12 starts being charged through the resistor $r_3$ and the voltage $e_2$ sharply changes from the ground potential toward the negative voltage $-E$ which the voltage $e_1$ took at the time $t_0$. Since the switch 14 is also turned on at the time $t_0$, the voltage $e_1$ gradually varies from the negative voltage $-E$ through the ground potential toward a positive voltage $$\frac{R_2 - R_1}{R_2 + R_1} E,$$

the voltage $e_2$ does not reach the negative voltage $-E$, but instead rises gradually through the ground potential toward the positive potential $$\frac{R_2 - R_1}{R_2 + R_1} E.$$

The time it takes for the voltage $e_2$ to reach the ground potential after the time $t_0$ is selected to be in the range of from 0.3 to 0.4 second.

The switches 14, 16 in the voltage generating circuit 10 are switched by an output signal $S_1$ from a switching control circuit 25. In response to a preliminary focusing operation starting signal $S_t$ applied to the switching control circuit 25 at the time $t_0$, the output signal $S_1$ is changed from a low level to a high level, for example to thereby turn on the switches 14, 16. Then, the preliminary focus control voltage $e_2$ can be generated which, from the time $t_0$ on, sharply changes from the ground potential toward the negative voltage $-E$ and then rises gradually through the ground potential toward the positive voltage $$\frac{R_2 - R_1}{R_2 + R_1} E.$$

The preliminary focus control voltage $e_2$ is applied through a focus driving circuit 20 to a focus-adjusting means 21. An optical pickup 22 for emitting a laser beam to a disc and receiving a reflected laser beam from the disc is bodily swung or an objective lens in the optical pickup is swung dependent on the voltage $e_2$ to change the laser beam focusing condition. The focusing condition varies, for example, from an over-focused condition through a precisely-focused condition to an under-focused condition when the voltage $e_2$ crosses the ground potential. At this time, a focus error voltage $e_f$ generated by a photodetector for detecting focus condition in the optical pickup 22 varies, for example, from a positive value to a negative value as shown in FIG. 2.

The focus error voltage $e_f$ is applied to a focus discriminating circuit 23 which detects a zero-crossover point where the focus error voltage $e_f$ changes from a positive value to a negative value, that is, detects a precise-focusing point across which the focusing condition is shifted from an over-focused condition to an under-focused condition. At the detected precise-focusing point, an output signal $S_2$ from the focus discriminating circuit 23 varies from a low level to a high level. As the output signal $S_2$ thus changes from the low level to the high level, a switch 24 is changed from the turned-off state to the turned-on state and the output signal $S_1$ from the switching control circuit 25 supplied with the output signal $S_2$ changes from a high level to a low level to turn on the switches 14, 16 in the voltage generating circuit 10. The focus error voltage $e_f$ is applied as a focus driving signal via the focus driving circuit 20 to the focus adjusting means 21 so that the focus control operation is effected on the focus error voltage $e_f$. The focus driving circuit 20, the focus adjusting means 21, the optical pickup 22, the focus discriminating circuit 23, and the switch 24 jointly constitute a focus control circuit arrangement.

Figure 2:
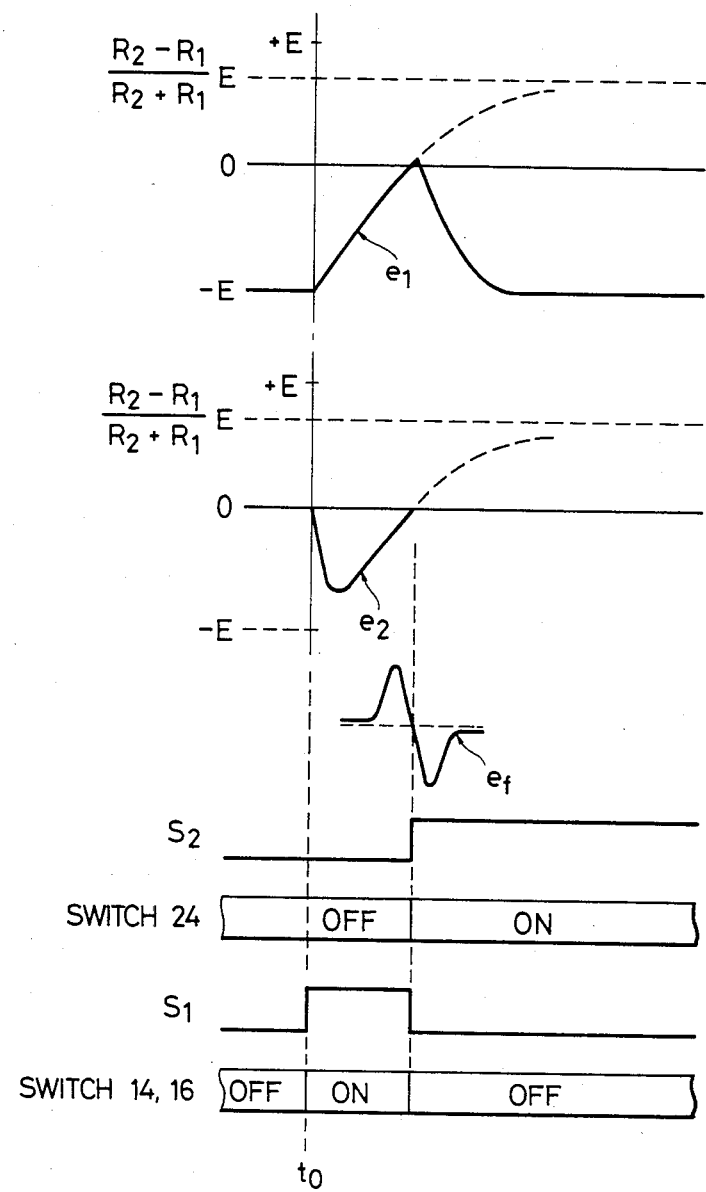
FIGS. 2 and 3 are diagrams used for explaining the operation of the preliminary focus control circuit shown in FIG. 1.

The voltage which sharply changes from the ground potential toward the negative voltage $-E$ and then gradually rises through the ground potential to the positive voltage $$\frac{R_2 - R_1}{R_2 + R_1} E,$$

as shown in FIG. 2, is normally applied once after the preliminary focusing operation starting time $t_0$ through the focus driving circuit 20 to the focus adjusting means 21 for thereby carrying out preliminary focus control. When the focus discriminating circuit 23 detects a zero crossover point where the focus error voltage $e_f$ varies from a positive value to a negative value, for example, the mode of focus control operation is initiated on the basis of the focus error voltage $e_f$. If the disc is not properly placed with the face and back thereof inverted in the optical disc player, then the laser beam emitted from the optical pickup 22 impinges on the back of the disc. Since a label or the like is attached to the back of the disc, the optical pickup 22 receives no laser beam reflected from the disc. Accordingly, the photodetector for detecting focus condition in the optical pickup 22 generates no focus error voltage $e_f$, and hence the focus discriminating circuit 23 fails to detect any zero crossover point where the focus error voltage $e_f$ would change from a positive value to a negative value upon elapse of a predetermined period of time after the preliminary focusing operation starting time $t_0$. When this happens, the above preliminary focus control will be carried out again.

Figure 3:
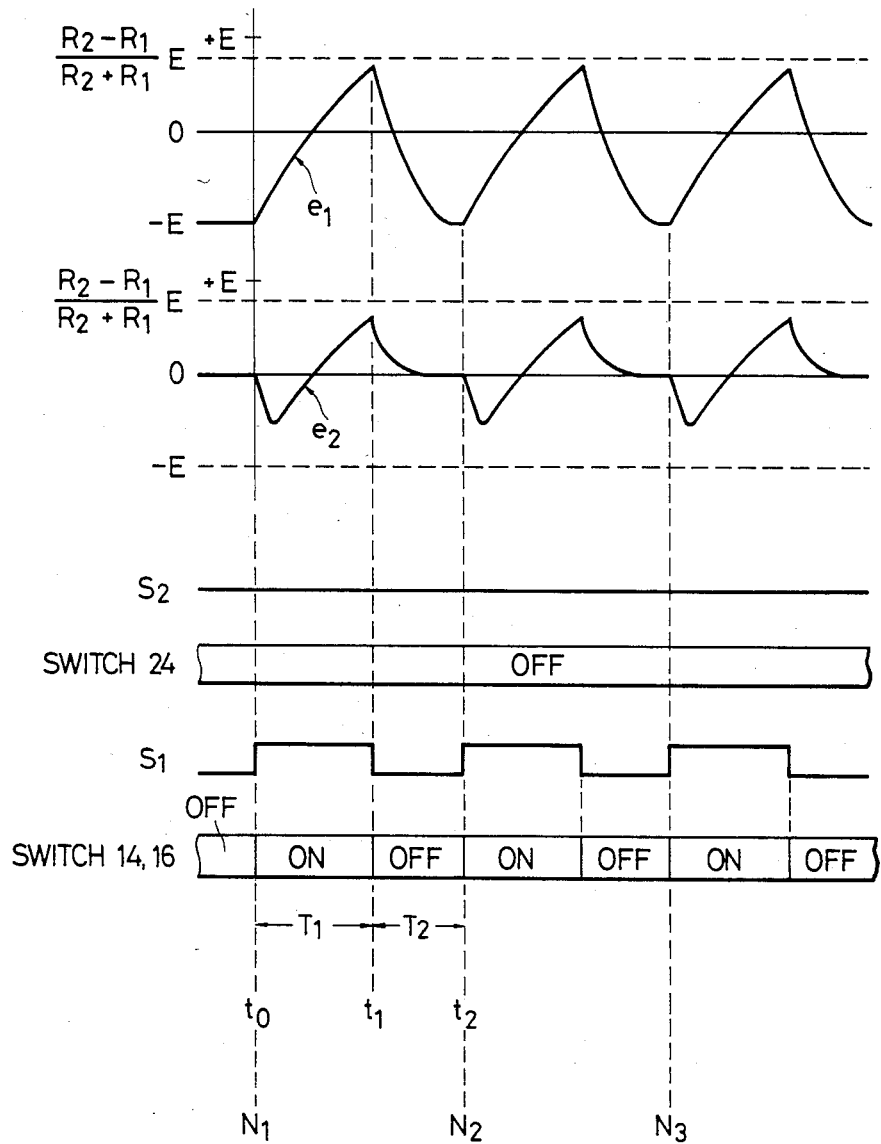

More specifically, the switching control circuit 25 includes a detector circuit for detecting whether or not the output signal $S_2$ from the focus discriminating circuit 23 has varied from a low level to a high level during a fixed interval of time $T_1$ after the preliminary focusing operation starting time $t_0$ when the output signal $S_1$ from the switching control circuit 25 changes from a low level to a high level. If the output signal $S_2$ does not change from the low level to the high level and no focus control operation is initiated within the time interval $T_1$ after the time $t_0$, as shown in FIG. 3, then the output signal $S_1$ varies from the high level to the low level at a time $t_1$ which is the time interval $T_1$ after the time $t_0$, thus to turn off the switches 14, 16 in the voltage generating circuit 10. When the switches 14, 16 are turned off, the voltage $e_1$ at the other end of the capacitor 11 in the voltage generating circuit 10 decays to the negative voltage $-E$ at a rate determined by a certain time constant, and the voltage $e_2$ at the other end of the capacitor 12 also decays to the ground potential at a rate determined by a certain time constant, as illustrated in FIG. 3. At a time $t_2$ upon elapse of a certain period of time $T_2$ after the time $t_1$, the output signal $S_1$ varies from the low level to the high level in the same manner as that at the time $t_0$ to turn on the switches 14, 16 again. The voltages $e_1$, $e_2$ vary again in the same manner as that from the time $t_0$ on, and the voltage $e_2$ is applied as the preliminary focus control voltage via the focusing driving circuit 20 to the focus adjusting means 21 for performing the foregoing preliminary focus control again. The above operation is repeated until the output signal $S_2$ from the focus discriminating circuit 23 changes from the low level to the high level to shift the switch 24 from the turned-off state to the turned-on state for thereby entering the mode of focus control operation.

An optical disc player of the present invention utilizes effectively such a preliminary focus control circuit as mentioned above for detecting an instance in which the disc is not properly loaded on the player, and has a capability for automatically unloading the disc or generating a warning sound or indication when the instance is detected.

Figure 4:
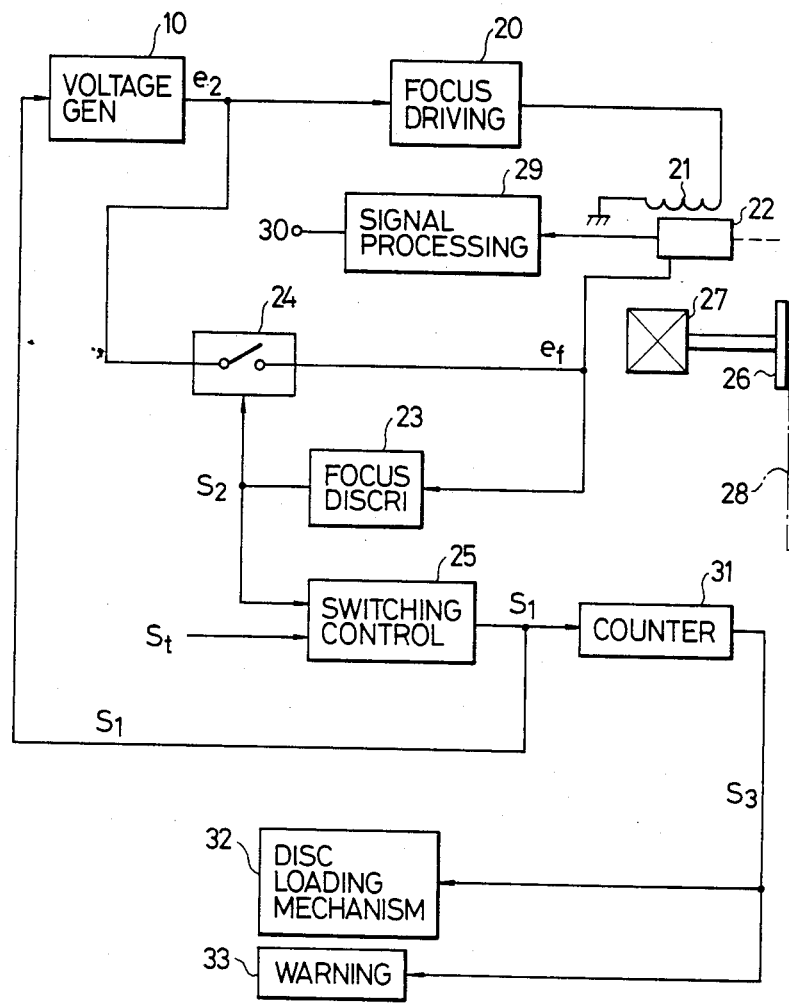
FIG. 4 is a system diagram showing an essential portion of an embodiment of optical disc player according to the present invention.

FIG. 4 illustrates an essential portion of an embodiment of optical disc player according to the present invention. In the embodiment of FIG. 4, a disc table 26 is rotated by a disc rotating motor 27. A disc 28 is loaded on the disc table 26 as shown by the dot-and-dash line. When the disc 28 is properly loaded in place for signal reproduction, signals are read from the disc 28 by the optical pickup 22, and read out signals are supplied to a signal processor circuit 29 in which the signals are processed to feed reproduced signals to an output terminal 30. This optical disc player also includes the voltage generating circuit 10, the focus driving circuit 20, the focus adjusting means 21, the optical pickup 22, the focus discriminating circuit 23, the switch 24, and the switching control circuit 25, which all constitute a preliminary focus control circuit accompanied with the focus control circuit arrangement as shown in FIG. 1.

When this preliminary focus control circuit effects the foregoing preliminary focus control and no switching to the focus control operation is carried out, the preliminary focus control is repeated. Accordingly, if the disc 28 is loaded with its face and back inverted on the disc table 26, and as a result no normal laser beam is reflected from the disc 28 when a laser beam is emitted from the optical pickup 22 onto the non-information-recorded surface of the disc 28, then the preliminary focus control is initiated at the instant at which the output signal $S_1$ from the switching control circuit 25 changes from the low level to the high level, as shown in FIG. 3. Since no switching to the focus control operation is carried out before the time interval $T_1$ elapses, the output signal $S_1$ decays from the high level to the low level. Upon elapse of the present time interval $T_2$, the output signal $S_1$ varies again from the low level to the high level to begin the preliminary focus control again. The foregoing cycle will be repeated. The number of positive-going edges of the output signal $S_1$ from the switching control circuit 25 is therefore identical with the number of starts of the preliminary focus control.

As a consequence, the number of starts of the preliminary focus control can be determined by detecting the number of positive-going edges of the output signal $S_1$ which are indicated by $N_1, N_2, N_3, \ldots$, for example, in FIG. 3. When the number of starts of the preliminary focus control exceeds a predetermined number, an instance in which the face and back of the disc 28 are inverted can be detected.

To this end, a counter 31 is connected to an output terminal of the switching control circuit 25 so as to be supplied with the output signal $S_1$ from the switching control circuit 25. The counter 31 counts the variations of the output signal $S_1$ from the low level to the high level, as indicated by $N_1$, $N_2$, $N_3$, ... in FIG. 3, and issues an output signal $S_3$ when the count reaches a predetermined number. The output signal $S_3$ is supplied to a disc loading mechanism 32 and a warning circuit 33. In response to the output signal $S_3$, the disc loading mechanism 32 unloads the disc 28 off the disc table 26, and the warning circuit 33 effects a warning action such as by presenting a warning indication or generating a warning sound.

Accordingly, in the case where the disc 28 is loaded with the face and back inverted on the disc table 26, when the preliminary focus control is repeatedly started a predetermined number of times, for example, four times, and therefore the counter 31 counts four rising edges of the output signal $S_1$ from the switching control circuit 25, it is determined that the laser beam from the optical pickup 22 is falling on the back of the disc 28, and the counter 31 issues the output signal $S_3$. Consequently, it is detected that the disc 28 is loaded with its face and back inverted. The output signal $S_3$ then drives the disc loading mechanism 32 and the warning circuit 33. Although not shown, the output signal $S_3$ from the counter 31 may be supplied to the voltage generating circuit 10 or the optical pickup 22 to stop its operation.

Figure 5:
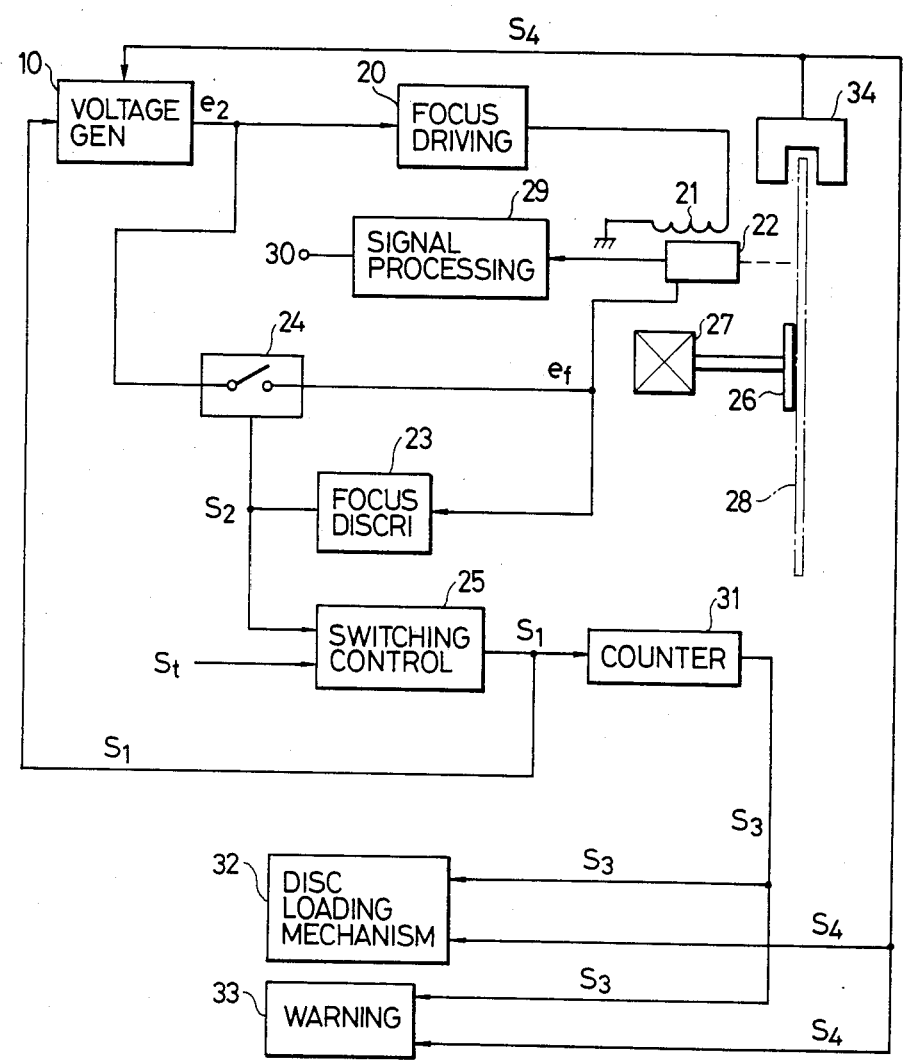
FIGS. 5 and 6 are system diagrams showing essential portions of other embodiments of optical disc player according to the present invention.

FIG. 5 is illustrative of an essential portion of another embodiment of optical disc player according to the present invention. This embodiment includes, in addition to the arrangement of FIG. 4, a disc presence discriminating means 34 for detecting whether a disc is loaded on the disc table 26. The disc presence discriminating means 34 is composed of a light-emitting diode and a phototransistor which are disposed in confronting relation with any disc 28, if any, therebetween. If the player happens to start its operation when there is no disc loaded, light emitted from the light-emitting diode is received by the phototransistor, so that the fact that there is no disc 28 loaded can be detected. A detected signal $S_4$ which is generated by the disc presence discriminating means 34 when there is no disc 28 loaded is supplied, for example, to the voltage generating circuit 10, the disc loading mechanism 32, and the warning circuit 33. In response to the detected signal $S_4$, the voltage generating circuit 10 does not generate the preliminary focus control voltage $e_2$ when the output signal $S_1$ rises from the low level to the high level and hence the preliminary focus control is not initiated. The disc loading mechanism 32 and the warning circuit 33 are responsive to the detected signal $S_4$ for restoring the disc table 26 to a condition capable of holding the disc 28 thereon and for effecting a warning action, respectively. With the arrangement of FIG. 5, therefore, the preliminary focusing control is performed only when the disc 28 is loaded in place, and then, whether the disc 28 is properly loaded or not is determined. If no disc 28 is loaded, then the preliminary focus control is not effected. Accordingly, any wasteful preliminary focus control is avoided.

Figure 6:
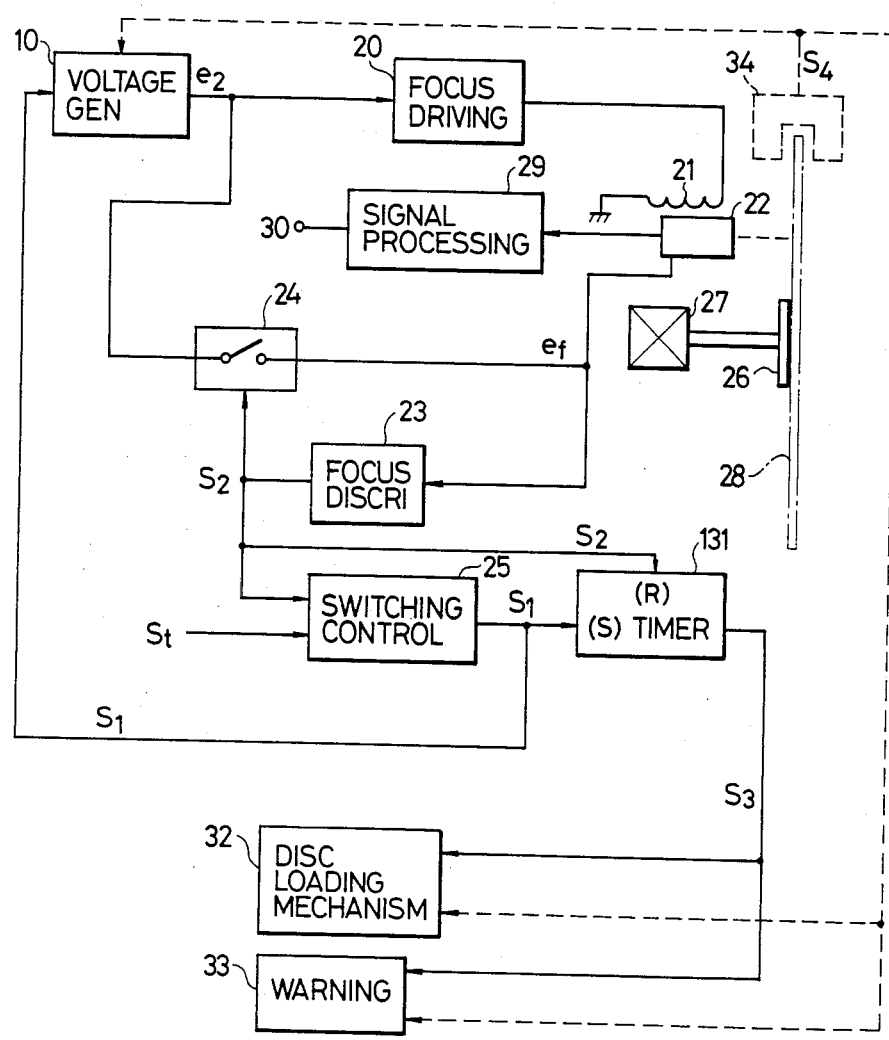

While in the embodiments shown in FIGS. 4 and 5, cycles of preliminary focus control are counted and the count is employed to determine whether the disc is loaded properly or not, the time required for certain cycles of preliminary focus control may be measured and the measured time may be used to determine whether the disc is loaded properly or not. FIG. 6 shows an essential portion of a still another embodiment of optical disc player according to the present invention, which is capable of determining whether a disc is loaded properly or not by detecting the elapse of such time.

As with the embodiments of FIGS. 4 and 5, the embodiment of FIG. 6 has the disc table 26 rotatable by the disc rotating motor 27. The disc 28 is loaded on the disc table 26 as shown by the dot-and-dash line. When the disc 28 is properly loaded in place for signal reproduction, signals are read from the disc 28 by the optical pickup 22, and read-out signals are supplied to the signal processor circuit 29 in which the signals are processed to feed reproduced signals to the output terminal 30. This embodiment also includes the voltage generating circuit 10, the focus driving circuit 20, the focus adjusting means 21, the optical pickup 22, the focus discriminating circuit 23, the switch 24, and the switching control circuit 25, which all constitute the preliminary focus control circuit accompanied with the focus control circuit arrangement as shown in FIG. 1.

When the preliminary focus control circuit effects the foregoing preliminary focus control and no switching to the focus control operation is carried out, the preliminary focus control is repeated. The output signal $S_1$ from the switching control circuit 25 changes from the low level to the high level as shown in FIG. 2 to initiate the preliminary focusing control. If a precisely focused condition is detected during the preliminary focus control, the output signal from the focus discriminating circuit 23 varies from the low level to the high level, whereupon switching from to the focus control operation is carried out. Therefore, the rising of the output signal $S_2$ from the low level to the high level is indicative of the ending of the preliminary focus control. The time period after the instant at which the output signal $S_1$ from the switching control circuit 25 rises from the low level to the high level and before the instant at which the output signal $S_2$ from the focus discriminating circuit 23 rises from the low level to the high level is identical to the time required for the preliminary focus control.

If the disc 28 is loaded with its face and back inverted on the disc table 26 and as a result no normal laser beam is reflected from the disc 28 when the laser beam is omitted from the optical pickup 22 onto the non-information-recorded surface of the disc 28, then the preliminary focus control is initiated at the instant at which the output signal $S_1$ from the switching control circuit 25 changes from the low level to the high level, as shown in FIG. 3. Since the output signal $S_2$ from the focus discriminating circuit 23 does not rise from the low level to the high level and the switching to the focus control operation is not carried out before the time interval $T_1$ elapses, the output signal $S_1$ decays from the high level to the low level. Upon elapse of the preset time interval $T_2$, the output signal $S_1$ varies again from the low level to the high level to begin the preliminary focus control again. The foregoing cycle will be repeated. As a consequence, an instance in which the disc 28 is loaded with its face and back inverted can be detected by detecting that the output signal $S_2$ does not rise from the low level to the high level upon elapse of a normal time required for the preliminary focus control after the output signal $S_1$ has risen from the low level to the high level.

This embodiment includes a timer 131 having a set terminal connected to an output terminal of the switching control circuit 25 and a reset terminal connected to an output terminal of the focus discriminating circuit 23. The set terminal of the timer 131 is supplied with the output signal $S_1$ from the switching control circuit 25, while the reset terminal thereof is supplied with the output signal $S_2$ from the focus discriminating circuit 23. The timer 131 starts measuring a time interval when the output signal $S_1$ rises from the low level to the high level and stops such a time measurement when the output signal $S_2$ rises from the low level to the high level. If the timer 131 after having started a time measurement measures a predetermined interval of time longer than the normal time for the preliminary focus control, the timer 131 issues an output signal $S_3$. The output signal $S_3$ is supplied to a disc loading mechanism 32 and a warning circuit 33. In response to the output signal $S_3$, the disc loading mechanism 32 unloads the disc 28 off the disc table 26, and the warning circuit 33 effects a warning action such as by presenting a warning indication or generating a warning sound.

Accordingly, in the case where the disc 28 is loaded with the face and back inverted on the disc table 26, when the preliminary focus control is repeatedly started a predetermined number of times, for example, three times, and therefore, the timer 131 measures a time consumed by three cycles of the preliminary focusing control after a positive-going edge of the output signal $S_1$ from the switching control circuit 25, it is determined that the laser beam from the optical pickup 22 is falling on the back of the disc 28, and the timer 131 issues the output signal $S_3$. Consequently, it is detected that the disc 28 is loaded with its face and back inverted. The output signal $S_3$ then drives the disc loading mechanism 32 and the warning circuit 33. Although not shown, the output signal $S_3$ from the timer 131 may be supplied to the voltage generating circuit 10 or the optical pickup 22 to stop its operation.

The disc presence discriminating means 34 as shown in FIG. 5 may be added to the arrangement of FIG. 6. The operation of the disc presence discriminating means 34 is the same as that according to the arrangement of FIG. 5, and will not be described in detail.

Applicability for Industrial Use

The optical disc player according to the present invention can automatically detect an instance in which a disc is loaded thereon with its information-recorded and non-information recorded surfaces inverted in error by an operator, and accordingly, is suitable for use in a compact disc player, a video disc player, or an optical disc memory player.

What is claimed is:

1. An optical disc player comprising:
a preliminary focus control circuit for making one or more attempts to effect preliminary focus control to bring a focus control circuit arrangement for a beam of light falling on an optical disc into a force condition and for generating a variable signal that undergoes repetitive variations in level during successive ones of said attempts,
detecting means responsive to said variable signal for detecting failure to achieve said focus condition within a prescribed number of said attempts and for generating an output signal indicative of said failure, and
means responsive to said output signal for performing a predetermined operation in case of said failure.

2. An optical disc player according to claim 1, wherein said detecting means comprises a counter supplied with said variable signal for counting said variations in level, said output signal being generated when said counter counts a predetermined number of said variations in level.

3. An optical disc player according to claim 1, wherein said detecting means comprises a timer supplied with said variable signal for measuring a time interval starting when the first one of said variations in level occurs, said output signal being generated when said timer measures a predetermined time interval.

4. An optical disc player according to claim 1 further comprising disc detecting means for detecting whether said disc is present or not, said preliminary focus control circuit being de-energizable in response to an output from said disc detecting means.

5. An optical disc player according to claim 1 wherein said means responsive to said output signal comprises a warning circuit.

6. An optical disc player according to claim 1 wherein said means responsive to said output signal comprises a disc loading mechanism for unloading said disc from a disc table.

7. An optical disc player for cooperating with a disc having an information-recorded surface on one side and a non-information-recorded surface on the other side; said optical disc player comprising:
means for generating an optical beam for scanning one side of said disc;
means for making one or more attempts to achieve preliminary focus;
means responsive to said attempts for generating a variable signal having alternately high and low levels during successive ones of said attempts, said optical beam being focused onto said disc if said disc is loaded in said player with an orientation such that said information-recorded surface is scanned by said optical beam and said alternately high and low levels being repeated during successive ones of said attempts if said disc is loaded in said player with an orientation such that said non-information-recorded surface is scanned by said optical beam;
detecting means responsive to said alternately high and low levels; and
signaling means operative after repetition of said alternately high and low levels a predetermined number of times for signaling to an operator of said optical disc player that said disc is loaded improperly.

8. An optical disc player according to claim 7; wherein said signaling means comprises circuitry responsive to said predetermined number of said repetitions.

9. An optical disc player according to claim 7; wherein said signaling means comprises circuitry responsive to the passage of a predetermined time interval after generation of said variable signal.

10. An optical disc player according to claim 7; wherein said signaling means comprises a disc loading mechanism and said signaling is effected at least in part by automatically unloading said disc.

11. An optical disc player according to claim 7; wherein said signaling means comprises a warning circuit and said signaling is effected at least in part by activating said warning circuit.

* * * * *